United States Patent
Aichinger-Rosenberger et al.

(10) Patent No.: US 12,126,373 B2
(45) Date of Patent: Oct. 22, 2024

(54) METHOD, MODEM AND NETWORK FOR COMMUNICATION BETWEEN DEVICES OF A VEHICLE

(71) Applicant: HELLA GmbH & Co. KGaA, Lippstadt (DE)

(72) Inventors: Michael Aichinger-Rosenberger, Spitz/Donau (AT); Dominik Fischer, Vienna (AT); Daniel Hochwarter, Tulbing (AT); Karlheinz Kellner, Krems (AT); Thomas Posnicek, Haitzendorf (AT)

(73) Assignee: HELLA GmbH & Co. KGaA, Lippstadt (DE)

( * ) Notice: Subject to any disclaimer, the term of this patent is extended or adjusted under 35 U.S.C. 154(b) by 34 days.

(21) Appl. No.: 17/773,055

(22) PCT Filed: Oct. 13, 2020

(86) PCT No.: PCT/EP2020/078681
§ 371 (c)(1),
(2) Date: Apr. 29, 2022

(87) PCT Pub. No.: WO2021/083658
PCT Pub. Date: May 6, 2021

(65) Prior Publication Data
US 2023/0246670 A1    Aug. 3, 2023

(30) Foreign Application Priority Data
Oct. 30, 2019  (DE) .................. 10 2019 129 241.7

(51) Int. Cl.
*H04B 1/707* (2011.01)
*H04B 3/54* (2006.01)

(52) U.S. Cl.
CPC ............... *H04B 1/707* (2013.01); *H04B 3/54* (2013.01)

(58) Field of Classification Search
CPC ........................................................ H04B 1/707
USPC ........................................................... 375/141
See application file for complete search history.

(56) References Cited

U.S. PATENT DOCUMENTS

| | | | |
|---|---|---|---|
| 9,762,374 B1* | 9/2017 | Li ............................ | H04B 3/54 |
| 2003/0052771 A1 | 3/2003 | Enders et al. | |
| 2005/0206240 A1 | 9/2005 | Enders et al. | |
| 2006/0171447 A1* | 8/2006 | Alon ....................... | H04J 13/00 375/146 |

(Continued)

FOREIGN PATENT DOCUMENTS

| | | |
|---|---|---|
| DE | 10142409 A1 | 4/2003 |
| DE | 10301637 A1 | 7/2004 |

(Continued)

OTHER PUBLICATIONS

International Search Report issued on Feb. 3, 2021, in International Application No. PCT/EP2020/078681.

(Continued)

*Primary Examiner* — Lihong Yu
(74) *Attorney, Agent, or Firm* — Patent Central LLC; Stephan A. Pendorf

(57) ABSTRACT

A method and a modem for communication between at least two devices (10) of a vehicle. The devices (10) communicate with each other via a common power supply line (1). A frequency spread method is used for communication.

4 Claims, 4 Drawing Sheets

(56) References Cited

U.S. PATENT DOCUMENTS

Figure 1:
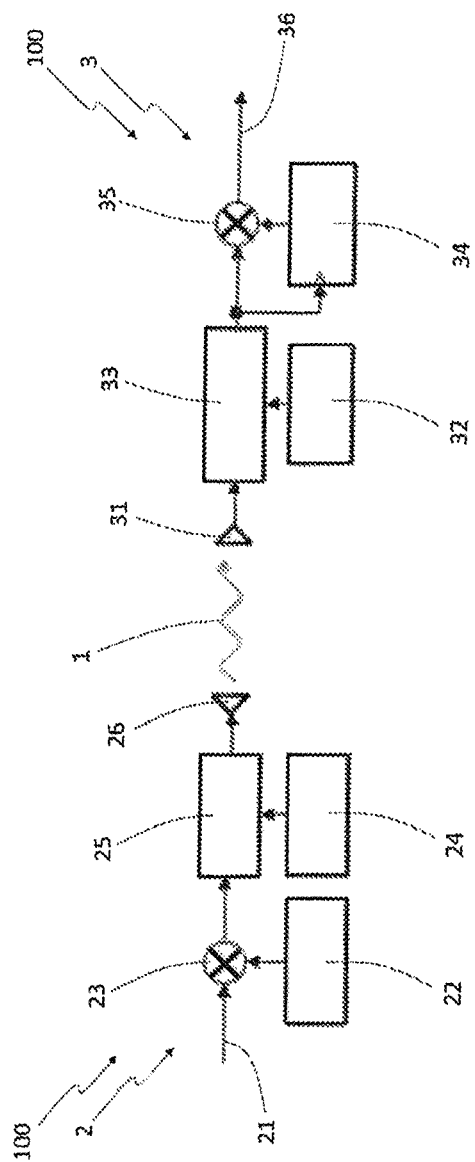
Figure 2A:
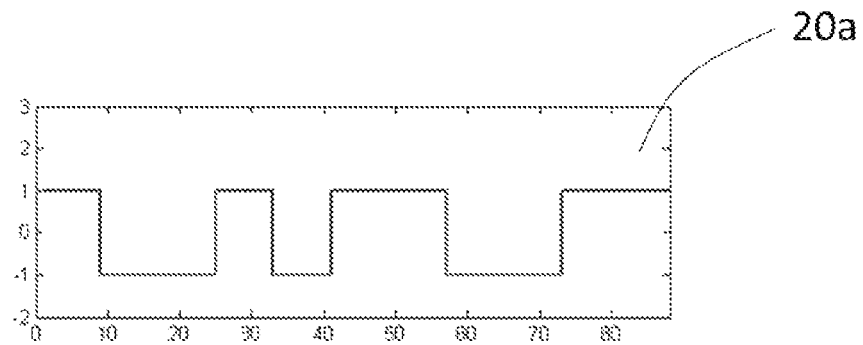
Figure 2B:
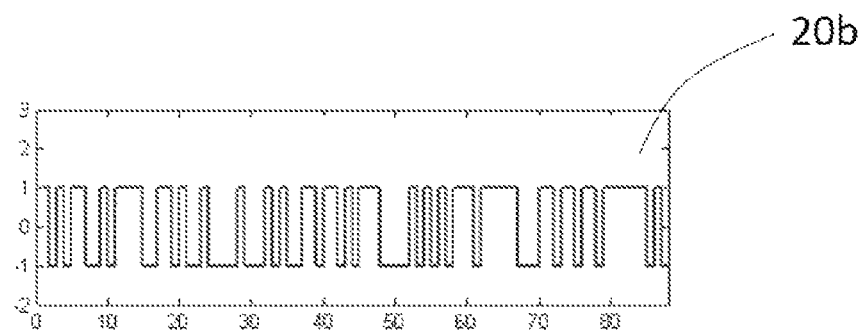
Figure 2C:
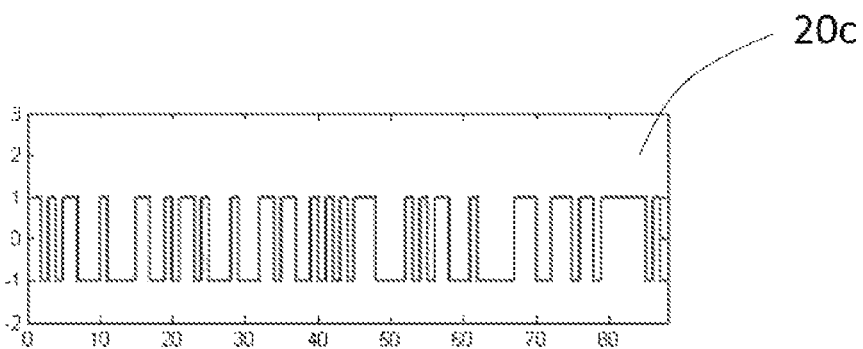
Figure 2D:
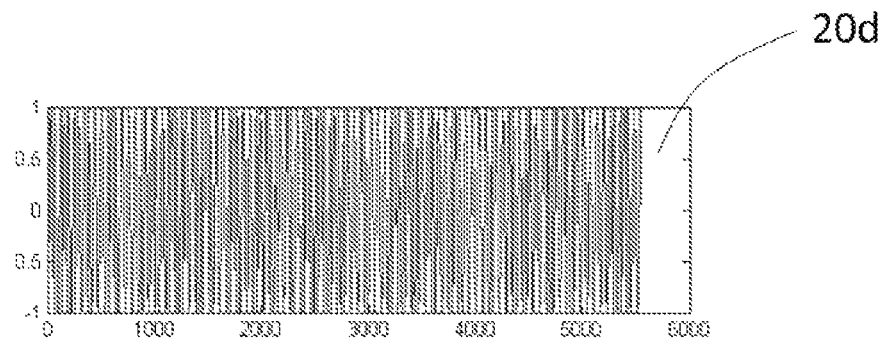

| | | | |
|---|---|---|---|
| 2009/0201974 A1* | 8/2009 | Song | H04J 13/0077 |
| | | | 375/E1.003 |
| 2010/0002753 A1 | 1/2010 | Lucas et al. | |
| 2014/0114492 A1* | 4/2014 | Logvinov | H04B 3/54 |
| | | | 700/295 |
| 2014/0150555 A1* | 6/2014 | Ikushima | G01N 29/2431 |
| | | | 73/596 |
| 2019/0154439 A1* | 5/2019 | Binder | G01B 11/26 |

FOREIGN PATENT DOCUMENTS

| | | |
|---|---|---|
| DE | 102006059689 A1 | 6/2008 |
| EP | 1289164 A1 | 3/2003 |
| EP | 1292060 B1 | 10/2014 |
| EP | B160072 A1 | 4/2017 |

OTHER PUBLICATIONS

International Preliminary Report on Patentability with English Translation of Written Opinion mailed on May 12, 2022, in International Application No. PCT/EP2020/078681.

\* cited by examiner

METHOD, MODEM AND NETWORK FOR COMMUNICATION BETWEEN DEVICES OF A VEHICLE

The present invention relates to a method, a modem and a network for communication between at least two devices of a vehicle, wherein the devices communicate with one another via a common power supply line.

PRIOR ART

Nowadays, for communication between devices in a vehicle, field buses in particular, such as a Controller Area Network (CAN) or a Local Interconnect Network (LIN), are used. The communications networks thereby established typically comprise a plurality of devices, in motor vehicles, for example, work lights and signal lights or segments thereof, cameras and on-board sensors and associated control units. The devices are in this case connected to each other with separate signal lines and the bus transceivers are driven via serial interfaces. Disadvantages of using such bus systems include bulkiness, complexity and the installation effort involved in setting up the signal line network, which has to be constructed in parallel to the power supply network. In particular with increasing motor vehicle autonomy, there has been a constant increase in the number of cameras, sensors and apparatuses for close range communication with other road users to be incorporated into the vehicle electrical system, meaning that the disadvantages associated with the wiring of all the devices arise more frequently.

The prior art has therefore pursued approaches which make it possible to dispense with a separate network of signal lines and instead utilize common power supply lines for communication using high-frequency data signals between the devices (so called power-line communication). In this respect, the challenge is to ensure sufficiently rapid and robust communication between the on-board devices despite the reflections and interfering and noise signals arising on the supply lines.

DE 101 42 409 A1 discloses a supply line structure for supplying energy to electrical components of a motor vehicle and for transmitting information between at least some of the components. To reduce the interference susceptibility of the supply line structure in the case of power-line communication and at the same time to be able to continue to ensure energy supply to electrical components, it is proposed therein for the supply line structure to comprise supply lines electrically isolated from the vehicle body as return lines from the components to at least one motor vehicle energy source. It is thus intended to make the communication system immune to interference by redesigning the supply line structure.

EP 3 160 072 A1 discloses a method for communication over a noisy channel, for example a power supply line in a vehicle, which is based on asynchronous data transmission using a modulation method based on phase shift keying, which is disclosed in EP 1 292 060 B1. The disadvantages of the proposed modulation method lie in the interference susceptibility thereof with regard to narrow-band interference and the high electromagnetic output power on the carrier frequency of the signal, whereby conflicts may arise with the statutory requirements for electromagnetic compatibility (EMC).

DISCLOSURE OF THE INVENTION

It is therefore the object of the present invention to propose a method for communication between devices of a vehicle via a common power supply line which enables data exchange which is so rapid that the known performance from established bus systems, in particular LIN or CAN, is reproduced and which is distinguished by a high level of robustness against interference signals and reduced power output.

This object is achieved on the basis of a method according to the preamble of claim 1 in conjunction with the characterizing feature. Advantageous further developments of the invention are indicated in the dependent claims.

The invention includes the technical teaching that a spread spectrum method is used for communication purposes.

The invention is based on the concept of additionally modulating the wanted signals to be transmitted as narrow-band modulations of a carrier signal and so enlarging the bandwidth thereof. The transmission power is thus distributed over a broad spectrum, which leads to reduced interference susceptibility with regard to narrowband noise, to increased security against interception and to lower power output per frequency band. The signal is transmitted as voltage modulation of the otherwise constant voltage supply to the devices involved. In this case, at least one device functions as a transmit unit and at least one device functions as a receiver. The communicating devices are electrically connected via their common power supply. The transmitter sends the signal as voltage modulation via the power supply in an asynchronous method, i.e. the transmitter sends a defined sequence of encoded bits, which the receiver uses for synchronization with the signal. The receiver decodes the signal and responds accordingly.

In one advantageous embodiment, a direct sequence spread spectrum (DSSS) method is used as the spread spectrum method. In the DSSS method the wanted signal is spread by means of a pre-determined bitstring, the "spreading code", such that the bits of the original bit string of the wanted signal are translated into a plurality of sub-bits, or chips. The bits of the wanted signal are thus transmitted as a sequence of DSSS signal bits. In this context, the term "spreading" refers to the frequency spectrum which is occupied by the signal to be transmitted after application of the DSSS method. Using the same operation, the wanted signal is reconstructed in the receiver. In this case, narrow-band interference signals added on the transmission path are spread in the receiver, such that the energy density of the interference signals is distributed accordingly by this spreading and the interference effect drops.

In the DSSS method, a Barker code is preferably used as the spreading code, in particular a Barker code of length 7. Barker codes are binary codes with minimum autocorrelation on shifting, such that the signals spread therewith have low cross-correlation with narrowband interference signals and, without closer analysis of the signal, appear as white noise. When using a short spreading code, for instance Barker 7, a sufficiently short latency time of the receiver can be achieved to operate communication via the power supply line for example as a LIN tunnel. Conceptually, the use of longer Barker codes with lengths of 11 or 13 might also be possible, although care must be taken to ensure that the performance of the hardware used, in particular of the microcontroller, is sufficiently high.

In the communication method according to the invention, a sinusoidal carrier signal with a carrier frequency from a frequency range of 1 MHz to 20 MHz is preferably used.

The invention relates, moreover, to a modem for communication via a power supply line between at least two devices of a vehicle, wherein the modem comprises at least the following means:
- a transmitting means, which is configured to encode a digital wanted signal with a spreading code and modulate it as a DSSS signal onto a sinusoidal carrier signal and transmit a resultant bus signal to the power supply line as voltage modulation, and
- a receiving means, which is configured to receive the bus signal from the power supply line and demodulate the bus signal into the baseband of the DSSS signal and decode the wanted signal from the DSSS signal using the spreading code.

Such a modem is configured to carry out the communication method according to the invention, wherein the transmitting and receiving means may for the most part be implemented in software-based manner on a microprocessor, with analog peripherals for signal filtering and synchronization.

The invention further relates to a network of devices of a vehicle, wherein the devices comprise at least one control unit and at least one light module of a lighting device, and wherein the devices are each connected to one another by means of a modem according to the invention via a common power supply line, characterized in that the devices communicate with one another, using one embodiment of the communication method according to the invention, via the power supply line. Such a network may in particular be a component of a passenger vehicle, but also for example be applied in trucks, tractive units or construction machinery and motorcycles as well as watercraft and aircraft.

Further devices such as signal lights and/or cameras and/or sensors may be incorporated into the network. For example, the control unit functions within the network as master and the other devices function as slaves. In a network hierarchy of this kind, the control unit is the only unit to have the right to unprompted access to the common power supply line for communication purposes, while the other devices are only entitled to transmit data via the power supply line when instructed or requested to do so by the control unit.

In particular, the devices of the network according to the invention are connected to each other solely by means of the common power supply line. The omission of additional signal lines leads to a reduction in the structural space required for the network and significant simplification of installation, such that it is more easily possible to integrate a large number of different devices into the network.

PREFERRED EXEMPLARY EMBODIMENT OF THE INVENTION

Figure 3:
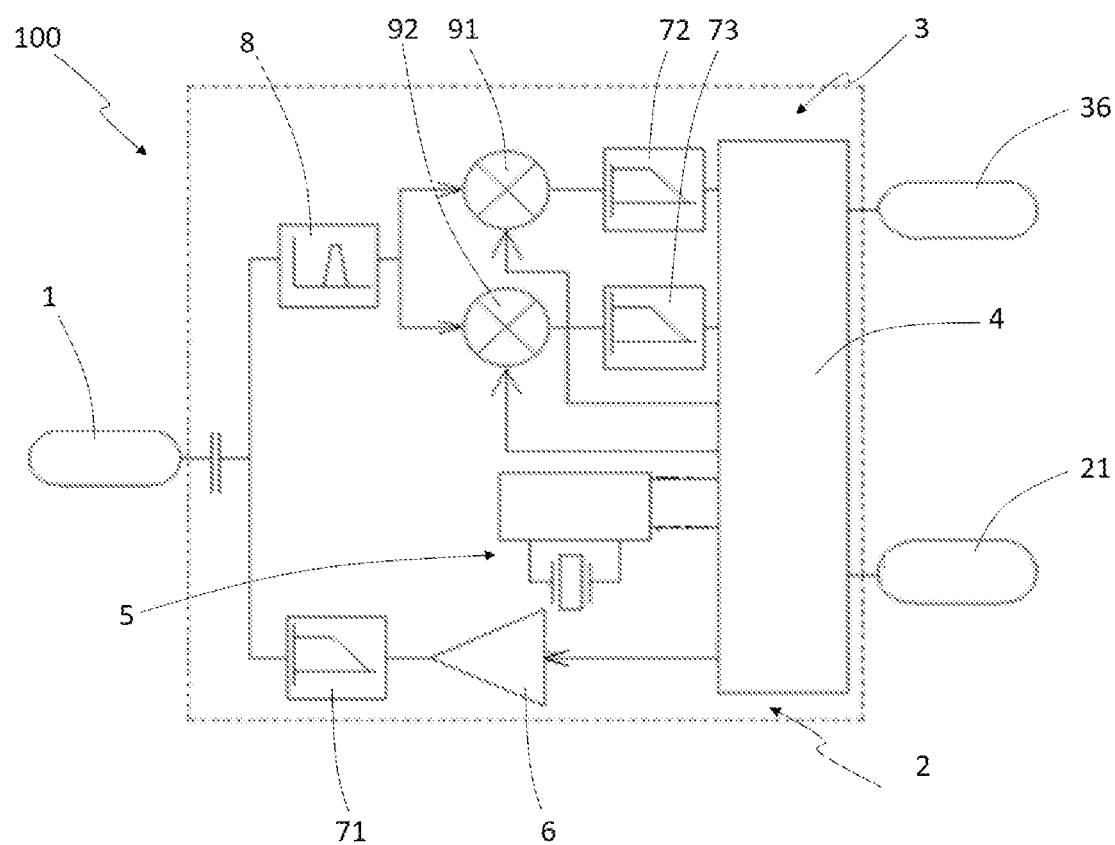
Figure 4:
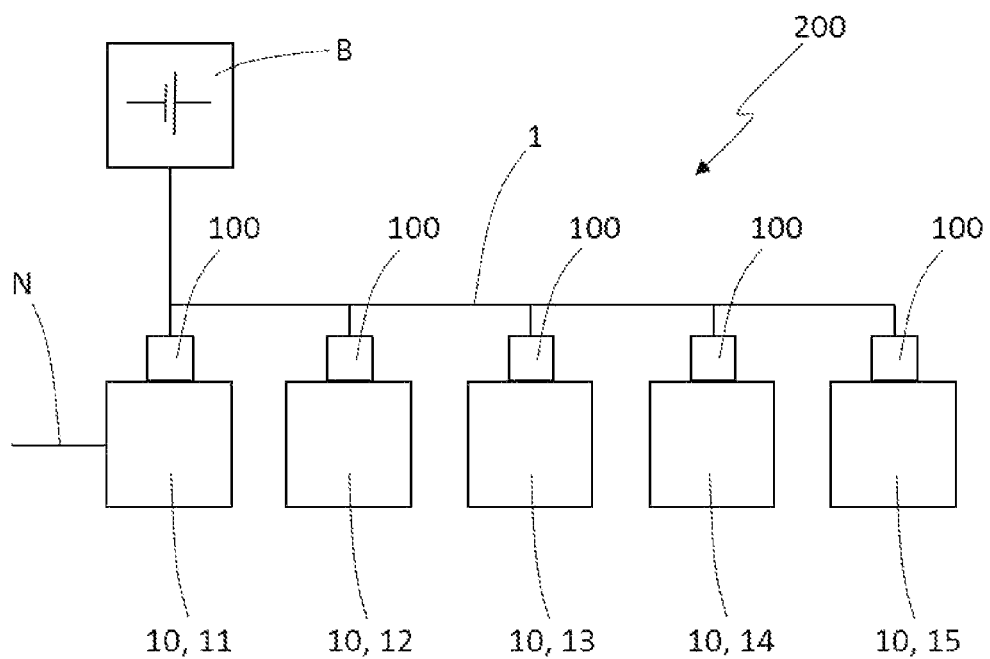

Further measures which improve the invention are described in greater detail below with reference to the figures, together with the description of a preferred exemplary embodiment of the invention. In the Figures:

FIG. 1 is a schematic representation of the communication method according to the invention, FIGS. 2a-d are function graphs of signal characteristics, FIG. 3 is a schematic representation of a modem according to the invention, and FIG. 4 is a schematic representation of a network according to the invention.

FIG. 1 shows a schematic representation of the communication method according to the invention, on the basis of the method steps taking place in a transmitting means 2 and a receiving means 3 of a modem 100 according to the invention.

In the transmitting means 2, after the input 21 of a digital wanted signal to be transmitted and the generation 22 of the spreading code, the wanted signal is encoded 23 with the spreading code, the resultant digital signal being designated a DSSS signal. Generation 24 of a high-frequency carrier signal proceeds, for example, using a quartz oscillator. The carrier signal then undergoes modulation 25 with the DSSS signal, preferably by means of phase or frequency modulation. Then the modulated carrier signal, which is designated a bus signal, is injected into 26 the power supply line 1 connecting the modems 100 and transported as voltage modulation of the otherwise constant voltage supply of the devices involved to the receiving means 3 in the modem 100 of the addressee.

In the receiving means 3, the bus signal is extracted 31 from the power supply line 1 and demodulation 33 takes place using the pure carrier signal generated in step 32 into the baseband of the DSSS signal. By re-multiplication of the DSSS signal by the spreading code generated in step 34, the transmitted wanted signal is decoded 35, said wanted signal then being forwarded through the signal output 36 to the addressed device.

The spread spectrum method used reduces transmission sensitivity to narrowband interference, for example by other devices in the vehicle, by maximally uniformly dividing the signal over a wide frequency band. The spectral power density of the transmitted signal is minimized by the spread spectrum, whereby the electromagnetic compatibility of the communication method according to the invention is improved. In addition, the method can be implemented on relatively low-power, conventional commercial microcontrollers. In particular, all the digital signal processing method steps, i.e. generation 22, 32 of the spreading code, decoding/encoding 35, 23 of the signals and (de)modulation 33, 25 of the carrier signal, are carried out in a software-based manner on a suitable microcontroller.

FIGS. 2a-d show function graphs as exemplary time characteristics of a typical digital wanted signal 20a, of a spreading code 20b, of the encoded DSSS signal 20c and of the resultant bus signal 20d. The wanted signal 20a represents the binary code "1 0 0 1 0 1 1 0 0 1 1", which corresponds for example to a portion of a LIN control command. The spreading code 20b represents a low-correlation bit sequence, in this case a Barker 7 code. The length of a bit of the wanted signal 20a here corresponds to seven chips of the spreading code 20b. The DSSS signal 20c results from multiplication of the wanted signal 20a by the spreading code 20b. Each bit of the wanted signal 20a is thus spread over seven bits of the DSSS signal 20c. Communication between the connected devices may thus proceed with a short latency time, in particular the typical latency time for the LIN protocol of about 1 ms may be achieved. Like the spreading code 20b, the DSSS signal 20c has a minimum autocorrelation on shifting. To unauthorized third parties intercepting the bus signal 20d, the corresponding modulation of the carrier signal therefore looks like white noise, such that the signal transmission is virtually imperceptible as such for third parties. The used carrier signal is preferably a sinusoidal oscillation with a frequency in the range from 8 MHz to 13 MHz. To form the bus signal 20d, which represents the voltage modulation transported over the power supply line, the carrier signal is modulated with the DSSS signal, wherein in principle any desired modulation method can be used for this purpose, in particular a phase or frequency modulation method.

FIG. 3 shows a schematic representation of a modem 100 according to the invention for carrying out the communication method according to the invention over a power supply line 1. The essential components of the modem 100 are the microcontroller 4, the quartz oscillator 5 and the analog peripherals for filtering and synchronization.

The microcontroller 4, for example of type RL78/F13 from Renesas Electronics Corp., is connected via serial data interfaces (UART) respectively as a signal input 21 or signal output 36 with an associated device of the communications network. Digital signal processing, i.e. encoding and decoding of the wanted signal using the spreading code, and signal modulation using the carrier signal provided by the quartz oscillator 5, is carried out on the microcontroller 4. The microcontroller 4 is thus a component both of the transmitting means 2 and of the receiving means 3.

The transmitting means 2 additionally comprises the signal amplifier 6, in which the carrier signal modulated with the DSSS signal is amplified, and the low-pass filter 71 for noise suppression and elimination of electromagnetically incompatible high-frequencies. The resultant bus signal is injected into the power supply line 1 on the output side of the transmit means 2, the modem 100 being capacitively coupled to said power supply line.

The receiving means 3 has a bandpass filter 8 on the input side, which bandpass filter limits the signals received by the power supply line 1 to the frequency range, used for communication, around the carrier frequency. The resultant signal is divided between the two mixers 91, 92 and demodulated there component-wise. The low-pass filter 72, 73 reduces the demodulated signal to the baseband of the DSSS signal and transmits it to the microcontroller 4 for decoding.

Data processing sufficiently rapid to meet LIN specifications can be achieved with the modem 100 according to the invention. To meet the more demanding CAN specifications, the modem 100 would have in particular to be equipped with a more powerful microcontroller than the type RL78/F13 from Renesas Electronics Corp. mentioned by way of example. For synchronization purposes, a signal sampling accuracy of around 1 µs is necessary for the spread spectrum method used. Therefore, the quartz oscillator 5 used must in particular be of correspondingly high quality.

FIG. 4 is a schematic representation of a network 200 according to the invention in a vehicle comprising a plurality of devices 10, which are connected via serial interfaces in each case to a modem 100 according to the invention and to one another via a common power supply line 1. Battery B, for example the starter battery of a motor vehicle, serves to operate the devices 10, supplying said devices 10 with DC voltage. The modems 100 are coupled capacitively to the power supply line 1 and transmit the bus signals in network 200 as high-frequency voltage modulations on the DC supply voltage.

In the network 200 shown here, the devices 10 consist of a control unit 11, a light module 12, a signal light 13, a camera 14 and a sensor 15. In particular, the control unit 11 functions as master and the other devices 12, 13, 14, 15 function as slaves.

The network according to the invention may, for example, also constitute a sub-network of a vehicle electrical system, for instance of a LIN or CAN bus. To this end, in the embodiment represented here, the control unit 11 is connected via the network connection N to the rest of the vehicle electrical system.

The invention is not limited in embodiment to the above-stated preferred exemplary embodiment. Rather, a number of variants are conceivable which make use of the solution described even in the case of fundamentally different embodiments. All the features and/or advantages resulting from the claims, description or drawings, including structural details or spatial arrangements and method steps, may be essential to the invention both per se and in the most varied combinations.

LIST OF REFERENCE SIGNS

100 Modem
200 Network
1 Power supply line
10 Device
11 Control unit
12 Light module
13 Signal lights
14 Camera
15 Sensor
2 Transmitting means
20a Wanted signal
20b Spreading code
20c DSSS signal
20d Bus signal
21 Input of wanted signal
22 Generation of spreading code
23 Encoding of wanted signal
24 Generation of carrier signal
25 Modulation of carrier signal
26 Signal injection
3 Receiving means
31 Signal extraction
32 Generation of carrier signal
33 Demodulation
34 Generation of spreading code
35 Decoding
36 Signal output
4 Microcontroller
5 Quartz oscillator
6 Amplifier
71, 72, 73 Low-pass filter
8 Bandpass filter
91, 92 Mixer
B Battery
N Network connection

The invention claimed is:

1. A network (200) of a plurality of devices (10) of a vehicle, wherein the devices (10) comprise at least one control unit (11) and at least one light module (12) of a lighting means, wherein the devices (10) are each connected together via serial interfaces in each case to a modem (100) and to one another via a common power supply line (1), wherein a battery (B) serves to operate the devices (10), supplying said devices (10) with DC supply voltage, wherein the modem is coupled capacitatively to the common power supply line (1), wherein the modem (100) comprises a microcontroller (4) comprising at least the following means:

a transmitting means (2), which is configured to encode a digital wanted signal (20a) with a spreading code (20b) and modulate it as a direct sequence spread spectrum (DSSS) signal (20c) onto a sinusoidal carrier signal and transmit a resultant bus signal (20d) in the network (200) to the power supply line (1) as high-frequency voltage modulations on the DC supply voltage, and a receiving means (3), which is configured to receive the bus signal (20d) from the power supply line (1) and demodulate the bus signal (20d) into the baseband of the DSSS signal (20c) and decode the wanted signal (20a) from the DSSS signal (20c) using the spreading code (20b), wherein the microcontroller (4) is provided with software for carrying out all digital signal processing, and wherein the devices (10) communicate with one another over the power supply line (1) by transmitting the DSSS signal from one of said devices (10) to another of said devices (10).

2. The network (200) according to claim 1, wherein the devices (10) further comprise at least one of signal lights (13), cameras (14) and sensors (15).

3. The network (200) according to claim 1, wherein the control unit (11) functions as master and the other devices (12, 13, 14, 15) function as slaves.

4. The network (200) according to claim 1, wherein the devices (10) are connected to one another solely by means of the common power supply line (1).

* * * * *